US007181165B2

(12) United States Patent
Yongji et al.

(10) Patent No.: US 7,181,165 B2
(45) Date of Patent: Feb. 20, 2007

(54) LOCAL WIRELESS AUDIO SIGNAL RF TRANSMITTER AND RECEIVER HAVING A SINGLE DOWNCONVERTER WITHOUT NEED FOR IF CARRIER

(75) Inventors: Huang Yongji, Kowloon (HK); Xu Zhi Jian, Guangzhou (CN)

(73) Assignee: Uni-Art Precise Products Ltd., Kowloon (HK)

( * ) Notice: Subject to any disclaimer, the term of this patent is extended or adjusted under 35 U.S.C. 154(b) by 544 days.

(21) Appl. No.: 10/649,476

(22) Filed: Aug. 26, 2003

(65) Prior Publication Data

US 2005/0057403 A1 Mar. 17, 2005

(51) Int. Cl.
*H04B 1/00* (2006.01)
*H04B 7/00* (2006.01)

(52) U.S. Cl. ........................ 455/42; 455/205; 455/112; 455/323

(58) Field of Classification Search ................ 455/324, 455/112, 42, 113, 120, 121, 123, 125, 127.1, 455/127.3, 208, 344, 348.1, 318, 351, 205, 455/61, 74, 119, 116, 126, 207, 177.1, 323, 455/210, 41.2; 343/702; 342/407
See application file for complete search history.

(56) References Cited

U.S. PATENT DOCUMENTS 3,678,403 A * 7/1972 Craft .......................... 330/267
3,798,550 A * 3/1974 Takaoka ...................... 455/208
4,905,087 A * 2/1990 Lupinetti ..................... 348/731
5,701,598 A * 12/1997 Atkinson ................. 455/161.2
5,714,918 A * 2/1998 Menkhoff ................. 333/28 R
6,002,925 A * 12/1999 Vu et al. .................... 455/313
6,198,825 B1 3/2001 Daryanani
6,215,981 B1 * 4/2001 Borchardt et al. ............ 455/42
2003/0122534 A1 * 7/2003 Seppinen et al. ........ 324/76.51
2004/0053596 A1 * 3/2004 Svensson et al. ........... 455/324

* cited by examiner

*Primary Examiner*—Edward Urban
*Assistant Examiner*—John J. Lee
(74) *Attorney, Agent, or Firm*—Larson & Larson; Herbert W. Larson

(57) ABSTRACT

A local wireless system for transmitting a modulated RF carrier audio signal from a base unit to a receiver unit is provided. The base unit has a pair of audio input connections of which are coupled to an audio source amplification device for receiving left and right audio signals. The receiver unit has a pair of electroacoustic transducers (speakers) for reproducing demodulated left and right audio signals modulated upon the RF carrier audio signal. The base unit encloses a transmitting circuit having a first antenna and first, second and third circuits which modulate the left and right audio signals onto an RF carrier signal in the 900 MHz range. A receiver unit encloses a receiver circuit and is coupled to the pair of speakers. The receiver circuit performs a single downconversion of the modulated RF carrier signal from the 900 MHz range to a useable 10.7 MHz left and right signal.

19 Claims, 3 Drawing Sheets

LOCAL WIRELESS AUDIO SIGNAL RF TRANSMITTER AND RECEIVER HAVING A SINGLE DOWNCONVERTER WITHOUT NEED FOR IF CARRIER

BACKGROUND OF THE INVENTION

1. Field of the Invention

This invention relates to the wireless transmission and reception of audio signals utilizing a modulated carrier RF signal. More particularly, it relates to the wireless transmission and reception of audio signals for a set of audio headphones wherein a modulated RF carrier signal in the 900 MHz range is employed to transmit the audio signals from a first stationary location (base unit) to a set of wireless audio headphones.

2. Background of the Prior Art

The transmission and reception of audio signals utilizing modulated RF carrier frequencies is well known in the prior art. The use of such technology to transmit audio signals from a base unit to a pair of wireless headphones is also known. In such use, the base unit is coupled to an audio processing device such as an audio receiver or amplifier which in turn is coupled to a CD player, phonograph player, radio receiver or other like audio producing device. The audio signal produced by one of these devices and processed by the audio receiver/amplifier is wirelessly transmitted to the audio headphones by way of the base unit coupled to the audio receiver/amplifier. High frequency carrier waves are employed wherein the audio information is modulated upon the high frequency carrier wave, transmitted by an antenna coupled to the base unit, received by a receiver unit (wireless headphones) also having an antenna, subsequently demodulated and thereafter converted to an audio signal which is reproducible by the wireless headphones.

The use of high frequency carrier waves in the 900 MHz range is known and became a standard for such wireless technology after the US government made the 900 MHz frequency range available for use by consumer electronic manufacturers. However, the manner in which these carrier frequencies are modulated and subsequently downconverted has remained complicated. One example can be seen in U.S. Pat. No. 6,215,981 to Borchardt et al. In such patent, a 900 MHz modulated RF carrier signal is used to transmit an audio signal from a base unit to a local receiving unit, such as, for example, a pair of wireless headphones. When the 900 MHz carrier frequency is received, it is downconverted a first time to an IF (intermediate frequency) of about 65 MHz. Thereafter, a second downconversion is affected to produce a lower frequency that can be reproduced by an electro acoustical transducer (the speakers within the pair of headphones). A standard FM radio receiver is coupled to the first downconverter and contains the second downconverter therewithin. The first downconversion converts the 900 MHz carrier signal to an intermediate frequency (IF) of 65 MHz signal. The second downconversion converts the signal to 10.7 MHz which is then demodulated into right and left audio signals which are reproducible by the electroacoustic transducers (speakers) of the wireless headphones. The second downconversion occurs in the standard FM radio receiver through the use of a VCO (voltage controlled oscillator) and a mixer. This prior art invention requires two downconversions, since the 65 MHz IF signal can not be demodulated into reproducible right and left audio signals. The 65 MHz IF signal is downconverted to a useable 10.7 MHz signal by the mixer after tuning the VCO to a suitable frequency level.

Since it would be desirous to simplify the transmission and reception process for this technology, improvements would be welcome. One such improvement could be to eliminate the need for two downconversions and hence the need for an IF carrier signal. This would certainly be an improvement in the art and represent a simplification of the transmission and reception process for wireless audio headphones.

SUMMARY OF THE INVENTION

We have invented an improved audio wireless headphone system utilizing modulated 900 MHz carrier signals to transmit audio signals emanating from a base unit coupled to an audio processing device to a receiver unit located within a pair of wireless audio producing headphones. Our improved wireless headphone system does not require two frequency downconversions. The IF carrier input signal is eliminated such that a modulated RF carrier frequency in the 900 MHz range is transmitted from the base unit to the wireless headphones and downconverted once within the headphones from the transmitted carrier frequency directly to a useable 10.7 MHz signal which is demodulated into reproducible right and left audio signals. Any VCO and mixer within the FM receiver of the headphones is not used as a second downconverter as practiced in the prior art. Instead, within an UHF module of the receiver, having a built in local oscillator and phase lock loop (PLL) circuit, the frequency can be changed by adjusting an outside crystal tuning circuit. In particular, the RF signal received by the antennae is mixed with the local oscillator frequency whereby the mixer directly converts the mixed signals to a 10.7 MHz signal which is subsequently demodulated into reproducible right and left audio signals. Accordingly, wherein we have invented a wireless transmission system for use with audio headphones whereby a variable frequency tuning system is employed with a built in local oscillator employing a single downconversion, the prior art utilizes a local oscillation frequency, two downconversions with the tuning system in the receiver block portion of the circuit and not in UHF module.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
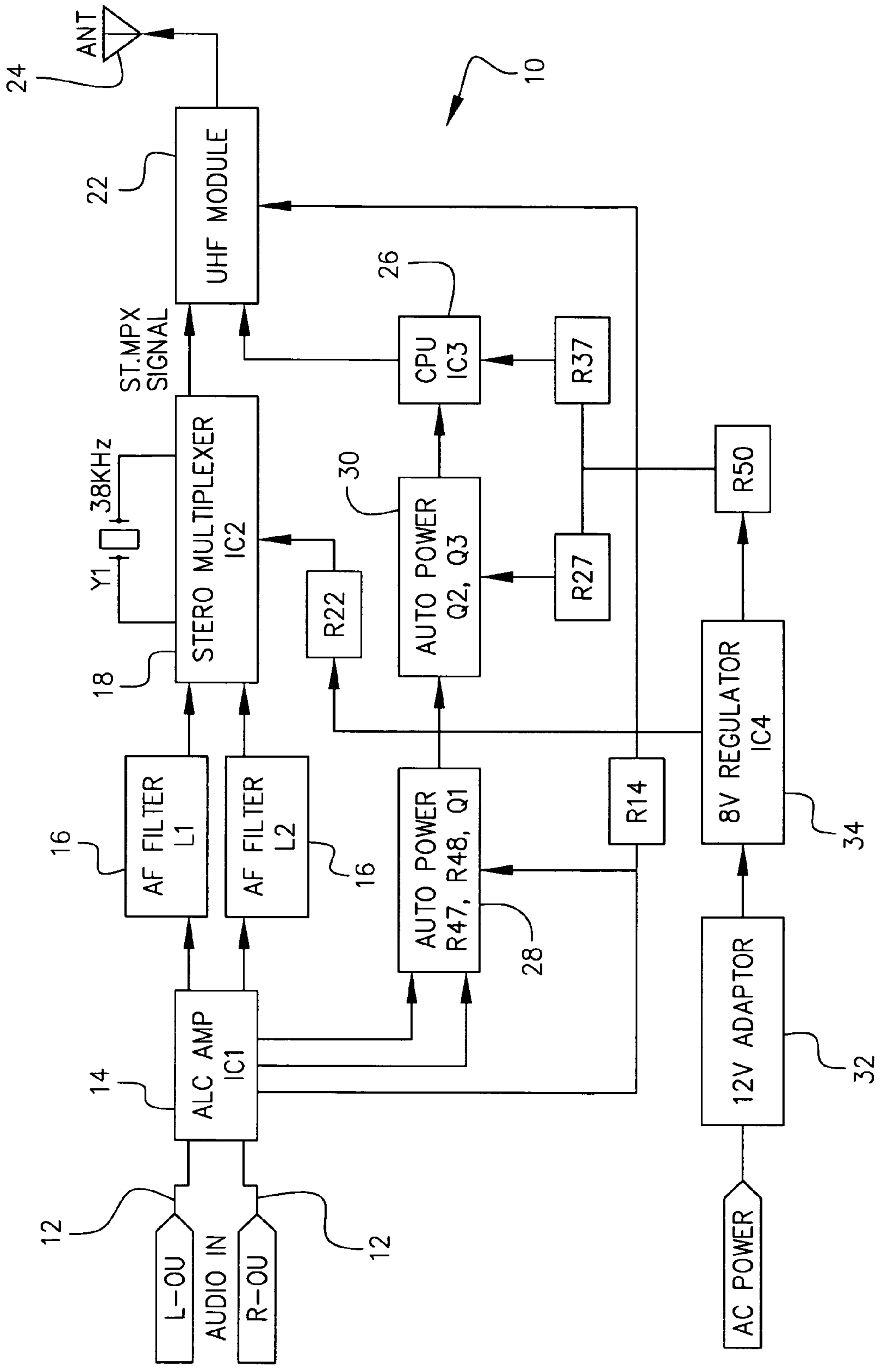
FIG. 1 is a block diagram of a transmitter used in the wireless headphone system of the present invention.

Throughout the following detailed description, the same reference numerals refer to the same elements in all figures.

With reference to FIG. 1, a transmitter circuit 10 used in the present invention is shown. Transmitter 10 is enclosed within a base unit (not shown) having a pair of audio input jacks 12 which couple to an audio amplifier which in turn is coupled to one of any type of audio producing devices, such as, for example, a CD player, a phonograph player, a cassette player or an FM/AM radio receiver. The input jacks couple directly to a first part of transmitter 10. Transmitter 10 is divided into three parts. A first part is the audio signal processing circuit. The second part is the micro control unit and control circuit. And finally, the third part is the power supply circuit and the charge circuit.

With continuing reference to FIG. 1, it is shown in the first part of transmitter 10 that input jacks 12 couple directly to an auto level control amplifier (ALC) circuit 14 thereby feeding an audio signal from the audio amplifier emanating from one of the many audio producing devices. After being amplified by auto level control amplifier circuit 14, both right and left signal are sent through an audio frequency (AF) low pass filter and pre-emphasis circuit 16. Thereafter, the audio signal is sent to a stereo multiplexer IC 18 which outputs a stereo multiplexed audio modulated signal. The multiplexed signal includes a left channel audio signal, a right channel audio signal and a pilot tone signal. The stereo multiplexed audio modulated signal is then sent to a UHF module 22 which modulates the signal up to a 912.5 MHz RF carrier signal (although other signals in the 900 MHz range could be employed). A transmitting antenna 24 coupled to UHF module 22 then sends the modulated RF carrier signal out to a receiver unit within the local area.

With continuing reference to FIG. 1, in the second part of transmitter 10, a CPU 26 is employed which is coupled to UHF module 22. CPU 26 contains a micro control unit and a control circuit which is in turn coupled to an auto power circuit made up of a first and second component 28 and 30. CPU 26 is controlled by the auto power circuitry and its ON/OFF signal and a band choose/change signal from a slide switch (not shown) and a change signal from a change signal circuit (also not shown). The micro control unit of CPU 26 sends a control signal to a phase lock loop (PLL) circuit within UHF module 22 to choose or change the RF frequency.

Again, with continuing reference to FIG. 1, the third part of transmitter 10 is shown wherein a 12V AC/DC power supply adapter 32 is employed which is coupled to an 8V regulator circuit 34. This third part of transmitter 10 supplies all necessary supply power to all components of transmitter 10 with the voltage that is required of each component.

Auto level control (ALC) amplifier 14 is a monolithic integrated circuit consisting of a dual equalizer amplifier. The stereo audio signal input jacks 12 connect directly to auto level control amplifier 14. If the input level is larger than the standard level, the output level would be limited and the output/input ratio would change.

Right and left audio frequency pre-emphasis circuits, a portion of AF filters 16, receive the audio signal output from ALC amplifier 14 and send it to the audio frequency low pass filters of AF filters 16 after passing through a resistor net. The two channel low pass audio frequency filters effectively remove high frequency audio noise above 15.625 kilocycles so that noise is reduced in the transmitted signal. This filtered signal from audio frequency filters 16 is then sent to a pre-emphasis circuit. Frequencies higher than 2 kilocycles are pre-emphasized, which is later de-emphasized by a de-emphasis circuit in the receiver headphone. This serves to improve the signal-to-noise ratio thereof. The resulting audio signal is then sent to stereo multiplexer IC 18.

Stereo multiplexer IC 18 is an integrated circuit used to generate a stereo composite signal. Stereo multiplexer IC 18 forms a baseband component representing the sum of left and right audio signals and a difference signal representing the difference between the left and right channel audio signal. This is sent to a built-in time-division-MPX which produces a multiplexed signal output. A left and right channel volume adjustor unit (not shown) can adjust the balance between the two audio channels. After combining the signals, the multiplexed signal and the 19 KHz pilot signal are sent to UHF module 22.

UHF module 22 includes a VCQ (Voltage Controlled Oscillator), a PLL (Phase Lock Loop) circuit and a radio frequency amplifier. The VCO circuit produces a radio frequency of about 912 MHz. The PLL circuit, controlled by a micro control unit (MCU) produces a voltage signal for the VCO circuit for choosing an appropriate radio frequency. This radio frequency is modulated by the combined multiplexed signal and the 19 KHz pilot signal. After been amplified, this modulated RF signal is sent to the one-quarter wavelength transmitting antenna 24. And at last, the transmitted signal is radiated within a local transmission area which typically is within a distance of about one-hundred feet from the transmitter unit.

Transmitter 10 is controlled by micro control unit IC (MCU) 26. In the preferred embodiment, MCU 26 is an 8 bit micro controller with 1*13K of EPROM. In transmitter 10, MCU 26 deals with the power ON/OFF signal and the charge signal of first and second auto power components, 28 and 30 respectively, to control two LED lights (not shown) and the power supply of UHF module 22. MCU 26 further is designed to judge the state of a slide switch and an output control signal to UHF module 22 for producing different radio frequencies. All of this control work is completed by firmware loaded onto MCU 26. When MCU 26 is operating, at first, it will judge the state of a charge signal. If there are batteries connected to transmitter 10, MCU 26 will shut off all other outputs so that transmitter 10 only works as a battery charger. If there are no batteries connected to transmitter 10, then MCU 26 will judge the power ON/OFF signal from another location. If there are no audio signal outputs from ALC amplifier 14, then there are no voltage signals to be sent, which makes a measurable voltage high whereby MCU 26 will then output low voltage signals so that a LED (not shown) is OFF. However, if there are audio signals outputted from ALC amplifier 14, the voltage of an output of MCU 26 is turned low causing MCU 26 to output a high voltage at another output to light the LED. MCU 26 then checks the state of the slide switch, wherein each of three states of the switch means different frequencies to be radiated out. MCU 26 checks the state and sends a control signal to the PLL unit within UHF module 22. MCU 26 can also receive a frequency signal from the PLL unit of UHF module 22 for comparing with the frequency created before. If these two frequencies are not the same, MCU 26 will send out a voltage control signal which will continue to operate until these two frequencies are the same.

Figure 2:
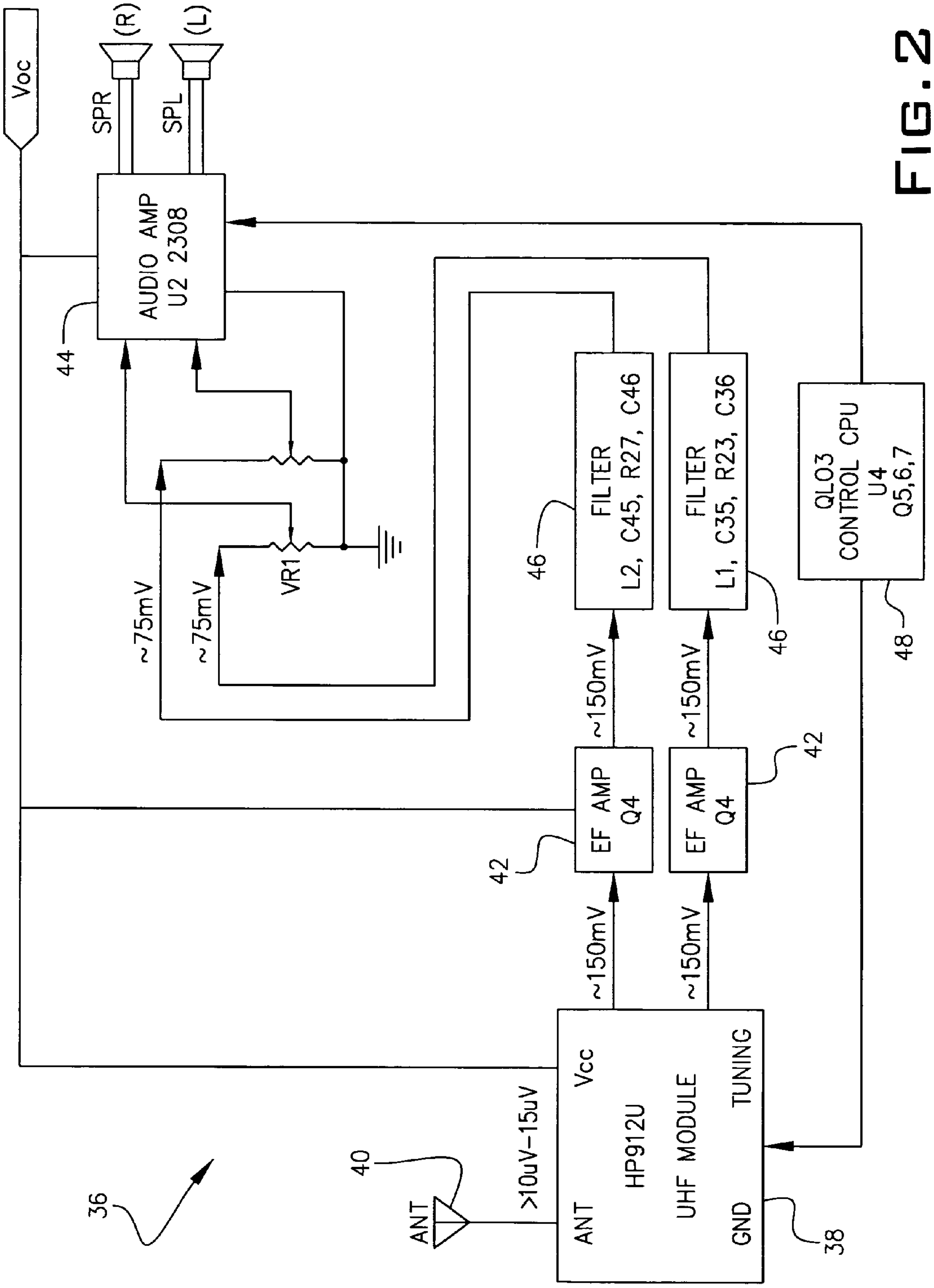
FIG. 2 is a block diagram of a receiver used in the wireless headphone system of the present invention.

With reference now to FIG. 2, a receiver circuit 36 is shown. Receiver 36 includes a UHF module 38. A receiver antenna 40 is coupled to an input network 50 (see FIG. 3) which is located inside UHF module 38. The input network 50 is a high pass filter with its output connecting to an RF amplifier. UHF module 38 also includes a voltage controlled oscillator (VCO) with a phase locked loop (PLL) circuit and a mixer circuit. The RF amplifier is employed to boost the level of the received 900 MHz range RF signal from antenna 40 (in the preferred embodiment, a 912.5 MHz RF signal is employed). This amplified signal is then passed to the mixer circuit 52 in UHF module 38, as shown in FIG. 3.

The local oscillation is created by the VCO and controlled by the PLL circuit. The VCO frequency is detected by the PLL circuit and divided by a 64 prescaler. Thereafter, the divided signal is compared with a reference frequency, produced by a control circuit, for obtaining an error voltage. This error voltage is used to lock the VCO frequency.

Figure 3:
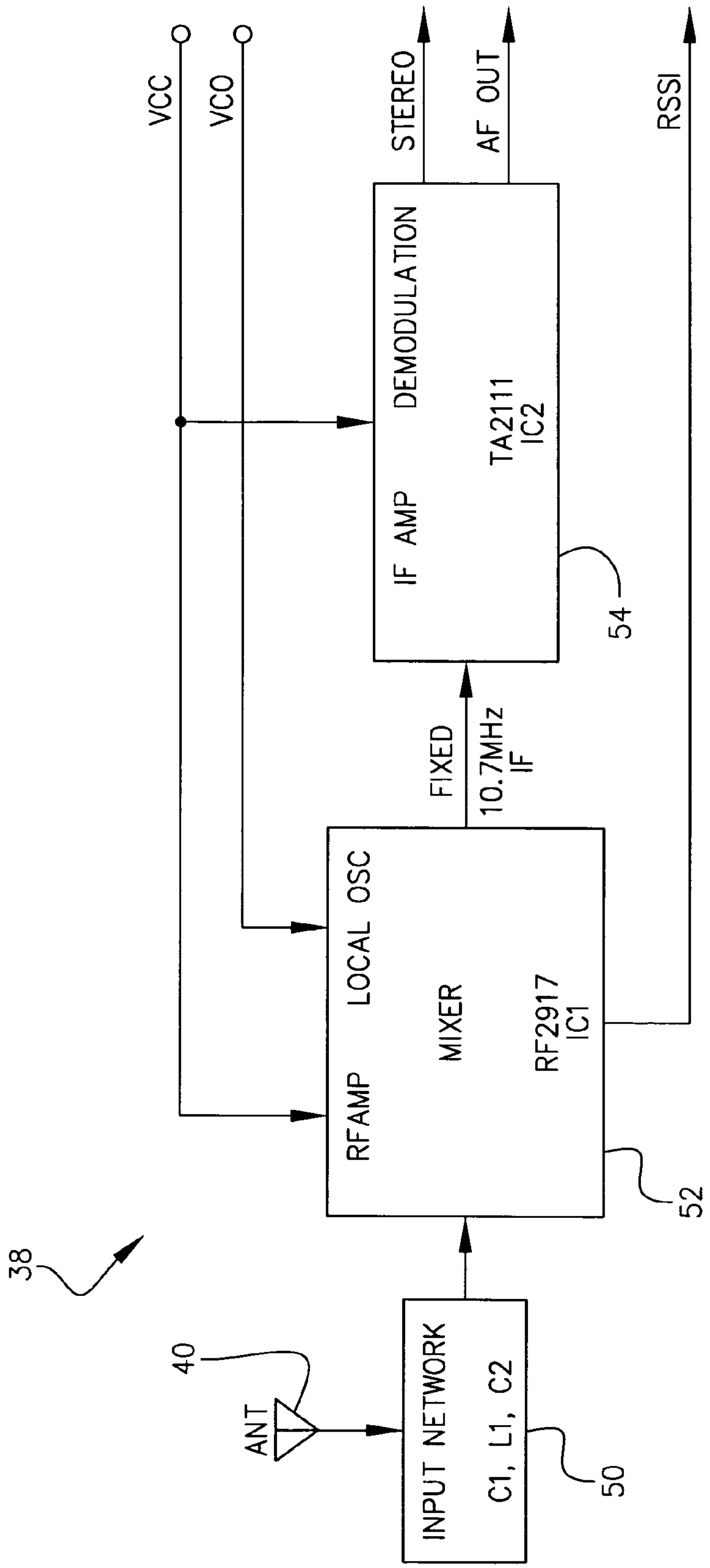
FIG. 3 is a block diagram of a UHF module of the receiver used in the wireless headphone system of the present invention.

With continuing reference to FIG. 3, the mixer circuit 52 of UHF module 38 serves to downconvert the received signal from the RF amplifier with the local oscillation frequency to create a useable 10.7 MHz signal. This 10.7 MHz signal is amplified and filtered and then outputted to an IF amplifier 54 built within UHF module 38. Thereafter the signal is sent through a detector and stereo demodulation (within the integrated circuit of IF amplifier 54) resulting in right and left channel audio signals.

In order to catch the modulated RF signal transmitted by transmitter 10, a certain reference frequency is chosen to lock the local oscillation in the receiver 36 of the system. Thereafter, the mixer circuit 52 will output the 10.7 MHz signal. For example, if a 912.5 MHz signal is transmitted, a control circuit outputs a suitable frequency so that a 901.8 MHz VCO frequency is outputted which results in the mixer circuit 52 outputting a useable 10.7 MHz signal (the difference between the 912.5 MHz and 901.8 MHz signals). Accordingly, receiver 36 is tunable by changing the reference frequency produced by the control circuit.

With reference to FIG. 2, the outputted right and left channel audio signals are then fed into a right and left channel EF AMP 42. After being amplified, the right and left channel signals are fed into an audio amplifier 44 through a filter network 46. Audio amplifier 44 amplifies the right and left channel signals to drive a pair of electroacoustic transducers or a pair of speaker elements with a set of wireless headphones. Audio amplifier 44 is a monolithic integrated circuit for use with stereo audio amplification.

Receiver 36 can receive three frequency signals by pressing a switch (not shown). The switch is connected to a CPU 48. When a signal switch is detected, CPU 48 begins to scan the RF signal transmitted by transmitter 10. Depending on its scanning result, CPU 48 selects a relevant crystal, or a proper reference frequency, to match to transmitter 10. CPU 48 is also employed to mute audio amplifier 44 when no signal is received.

Equivalent elements can be substituted for the ones set forth above such that they perform in the same manner in the same way for achieving the same result.

What is claimed is:

1. A system for transmitting a modulated RF carrier audio signal from a base unit to a receiver unit, the base unit having a pair of audio input connections coupled to an audio source amplification device for receiving left and right audio signals, the receiver unit having a pair of electroacoustic transducers for reproducing demodulated left and right audio signals modulated upon the RF carrier audio signal; the system comprising:

a) a transmitting circuit located within the base unit and having a first antenna and first, second and third circuits, the pair of audio input connections of the base coupled to the first circuit, the first circuit comprising an audio signal processing circuit, the second circuit comprising a micro control unit and control circuitry and the third circuit comprising a power supply circuit and charge circuit;

b) the audio signal processing circuit of the transmitter first circuit modulating the left and right audio signals received from the audio source amplification device for delivery upon an RF carrier signal in the 900 MHz range;

c) the micro control unit of the transmitter second circuit sending a control signal to the transmitter first circuit for choosing the RF carrier signal to be transmitted;

d) the power supply circuit and charge circuit of the transmitter third circuit supplying a DC voltage to the transmitter;

e) the first antenna transmitting the modulated RF carrier audio signal in the 900 MHz range to the receiver;

f) a receiver circuit located within the receiver unit and coupled to the pair of electroacoustic transducers enclosed therewithin, the receiver circuit comprising a second antenna coupled to an input network, a UHF module, a filtering network, a control unit and an audio amplifier, and g) the UHF module of the receiver circuit downconverting the modulated RF carrier audio signal in the range of 900 MHz to an audio signal which is reproducible by the receiver unit electroacoustic transducers through audio amplification, said downconverting occurring only once and not requiring an intermediate carrier frequency.

2. The system of claim 1, wherein the audio processing circuit of the transmitting circuit first circuit comprises an auto level control amplifier circuit coupled to the pair of audio input connections, left and right audio frequency filtering and pre-emphasis circuits coupled to the auto level control amplifier circuit, a stereo multiplexer IC coupled to the left and right audio frequency filtering and pre-emphasis circuits, a UHF module coupled to the stereo multiplexer IC, and the first antenna coupled to the UHF module.

3. The system of claim 2, wherein the stereo multiplexer IC of the transmitting circuit first circuit outputs a stereo multiplexed audio modulated signal having left and right audio signals and a pilot tone signal.

4. The system of claim 3, wherein the pilot tone signal is 19 KHz.

5. The system of claim 2, wherein the UHF module of the transmitting circuit first circuit outputs a 912.5 MHz RF carrier signal.

6. The system of claim 2, wherein the first antenna transmits the modulated RF carrier signal.

7. The system of claim 1, wherein the micro control unit and control circuitry of the transmitting circuit second circuit comprises a CPU coupled to the audio processing circuit UHF module and first and second auto power circuits coupled to the CPU.

8. The system of claim 7, wherein the CPU comprises a micro control unit for sending a control signal to a phase lock loop circuit within the transmitting circuit UHF module.

9. The system of claim 1, wherein the power supply circuit and charge circuit of the transmitting circuit third circuit comprises a 12V DC adapter coupled to an AC power source and a voltage regulator coupled to the 12V DC adapter for supplying a constant DC voltage to the transmitting circuit.

10. The system of claim 1, wherein the auto level control amplifier circuit of the transmitting circuit first circuit is a monolithic integrated circuit having a dual equalizer amplifier.

11. The system of claim 1, wherein the transmitting circuit first circuit UHF module comprises a voltage controlled oscillator, a phase lock loop circuit and a radio frequency amplifier.

12. The system of claim 1, wherein the once downconverted reproducible audio signal has a frequency of 10.7 MHz.

13. The system of claim 1, wherein the first antenna is a one-quarter wavelength transmitting antenna.

14. A system for transmitting a modulated RF carrier audio signal from a base to a receiver unit, the base unit including a pair of audio input connections coupled to a transmitting circuit having an antenna, the pair of audio input connections receiving left and right audio signals from an audio source amplification device, the system comprising:

a) a receiver circuit enclosed within the receiver unit coupled to a pair of electrostatic transducers for receiving the modulated RF carrier audio signal and downconverting said signal once to a second signal reproducible by the electrostatic transducers without the need of an intermediate carrier signal;

b) the receiver circuit having an antenna for receiving the modulated RD carrier audio signal, a single downconverter and a control circuit; and c) the modulated RF carrier audio signal is in the range of 900 MHz and the once downconverted second signal reproducible by the electroacoustic transducers is 10.7 MHz.

15. The system of claim 14, wherein the single downconverter comprises:

a) a frequency mixer;

b) a local oscillator; and c) a phase lock loop circuit.

16. The system of claim 15, wherein the local oscillator, controlled by the phase lock loop circuit, produces a desired tunable frequency signal which is subsequently directed to the downconverter frequency mixer.

17. The system of claim 16, wherein the desired tunable frequency signal is locked in reaction to the phase lock loop circuit receiving a feedback signal from the local oscillator and creating an error voltage.

18. The system of claim 15, wherein the receiver circuit control circuit produces a stable frequency signal which is used by the phase lock loop circuit as a reference frequency signal for the downconverter local oscillator.

19. The system of claim 18, wherein the reference frequency signal is adjustable by the receiver circuit control circuit to a desired tunable frequency signal, the desired tunable frequency signal enabling the local oscillator frequency signal to be matched with the modulated RF carrier audio signal in the downconverter mixer to produce the second signal reproducible by the electroacoustic transducers.

* * * * *